United States Patent [19]
Hutton

[11] 4,287,775
[45] Sep. 8, 1981

[54] FLUID FLOW MEASURING APPARATUS

[75] Inventor: Stanley P. Hutton, Southampton, England

[73] Assignee: Ferraris Development and Engineering Company Limited, London, England

[21] Appl. No.: 36,902

[22] Filed: May 7, 1979

[30] Foreign Application Priority Data

May 5, 1978 [GB] United Kingdom ............... 18072/78

[51] Int. Cl.³ ........................... G01F 1/06; A61B 5/08
[52] U.S. Cl. ................................. 73/861.79; 128/726
[58] Field of Search ............... 73/194 C, 229, 861.33, 73/861.79; 128/726; 272/99

[56] References Cited

U.S. PATENT DOCUMENTS

| 470,033 | 3/1892 | Beckmann | 73/229 |
| 4,089,220 | 5/1978 | Houlberg | 73/194 |
| 4,182,175 | 1/1980 | Boehringer | 73/229 |

FOREIGN PATENT DOCUMENTS

| 500801 | 6/1930 | Fed. Rep. of Germany | 73/229 |
| 2430904 | 1/1976 | Fed. Rep. of Germany | 73/229 |

Primary Examiner—Herbert Goldstein
Attorney, Agent, or Firm—Edwin E. Greigg

[57] ABSTRACT

An instrument comprises a rotor within a stator. The stator is mounted within a casing which forms a gallery which extends circumferentially around the stator, and an inlet which communicates with the gallery at one end and which projects radially outwardly with respect to the stator from that end. Oblique slots are formed in the stator so that fluid flow to be measured is passed from the gallery to the interior of the stator through them. A barrier in the gallery constrains fluid to flow around the gallery in one direction only.

8 Claims, 3 Drawing Figures

FLUID FLOW MEASURING APPARATUS

This invention relates to apparatus for measuring rate of flow of a fluid which is arranged so that, when used, the flow of fluid to be measured is circulated around a tubular stator and passed through to the interior of the stator via oblique slots which are formed in the tubular wall of the stator, the fluid that emerges from the inner ends of the slots forming a spirally swirling fluid flow which drives a rotor, there being means by which a readout indication of the fluid flow rate is derived from rotation of the rotor. Such apparatus will be identified throughout the remainder of this Specification as "fluid flow measuring apparatus of the kind referred to above".

Use of fluid flow measuring apparatus of the kind referred to above to provide an indication of a patient's respiration is governed by the sensitivity of the apparatus and by the pressure drop that is established between the inlet and the fluid flow outlet of the apparatus when the apparatus is used. It has long been recognised that that pressure drop needs to be very low if the apparatus is to be useful for indicating the respiratory peformance of very sick people. Apparatus which is sufficiently sensitive to respond to flow rates of the order of 2.5 liters per minute can be used to indicate the respiratory performance of the majority of patients but a greater sensitivity is necessary for measuring the respiratory performance of young children or very sick adults.

One form of fluid flow measuring apparatus of the kind referred to above which has been used widely for many years to provide an indication of a patient's respiration is an instrument which is described and illustrated in British Patent Specification No. 765,206 and which is known as a "Wright Respirometer". The tubular stator of a Wright Respirometer is mounted within a casing which forms a gallery, which extends circumferentially around the stator, and an inlet which communicates with the gallery at one end and which projects radially outwardly with respect to the stator from that end. That part of the instrument that comprises the rotor, the tubular stator and the casing that forms the gallery, the inlet and the fluid flow outlet is known as a turbine. The gallery extends from the inlet in both directions parallel to the axis of the stator. The opening that is formed by the outer end of each slot in the stator extends substantially parallel to the axis of the stator. The plane that is normal to the axis of the stator and that contains the axis of the inlet passes through each such opening. The end of each such opening that is nearer to the fluid flow outlet of the instrument is spaced from said plane by a distance which is less than the radius of the inlet. The other end of each such opening is further from said plane than is the adjacent end of the gallery. This instrument will respond to flow rates as low as 2.5 liters per minute so that it can be used to indicate the respiratory performance of most people but it is insufficiently sensitive for it to be useful to measure the respiratory performance of young children or very sick adults.

The use of disposable turbines in a Wright Respirometer has been precluded up to now because of the degree of precision that has been required to produce the instrument so that it will respond to flow rates as low as 2.5 liters per minute without there being an unacceptably high pressure drop across it. Hence each such instrument needs to be sterilized prior to its use with each patient.

An object of this invention is to improve the sensitivity of the known and widely used form of apparatus of the kind referred to above so that it can be used usefully to indicate the respiratory peformance of patients who are either so young or so sick that the presently available instrument is insufficiently sensitive to respond to their respiratory flows or so that the use of disposable turbines is a possibility.

According to this invention, in fluid flow measuring apparatus of the kind referred to above, means are provided by which all or substantially all the fluid flow to be measured is constrained to flow around the tubular stator in one circumferential direction only.

Preferably the location of the radially outer end of the oblique slots and the orientation of the oblique slots with respect to said one circumferential direction is such that the angle by which air or gas which enters each slot deviates from the flow path around the tubular stator is an acute angle.

Where apparatus includes a casing within which the tubular stator is mounted, the casing forming a circumferential gallery around the stator and an inlet which communicates with the gallery at one end and which projects outwardly with respect to the stator from that end, the fluid flow constraining means preferably comprise a barrier which extends across the gallery. The barrier may block the gallery completely or partially. The barrier may be located adjacent an edge of the mouth of the inlet that is formed at said one end of the inlet, the barrier being located between said inlet mouth edge and the oblique slot that, in the context of the circumferential direction of fluid flow within the gallery, is the furthest from the inlet mouth.

Where the casing forms an annular cavity which extends axially beyond one end of each of the openings that are formed by the outer ends of the slots, to form an annular alcove, there may be an annular insert which is located within the annular alcove and which forms an annular end wall of the annular gallery, the annular end wall extending across the annular cavity and being aligned substantially with the said one ends of each of the openings. Where the plane that is normal to the axis of the stator and that contains the axis of the inlet passes through each of the openings and the distance between said plane and said one end of each of the openings is less than the radius of the inlet, the surface of the annular insert that forms said annular end wall conveniently is recessed at a location which is aligned with the inlet. Preferably the fluid flow outlet communicates with the interior of the tubular stator and is nearer to said one end of each of the openings than to the other ends of those openings. Conveniently the barrier and the insert together comprise a composite ring from which the barrier projects.

One embodiment of this invention will be described now by way of example with reference to the accompanying drawings, of which:

Figure 1:
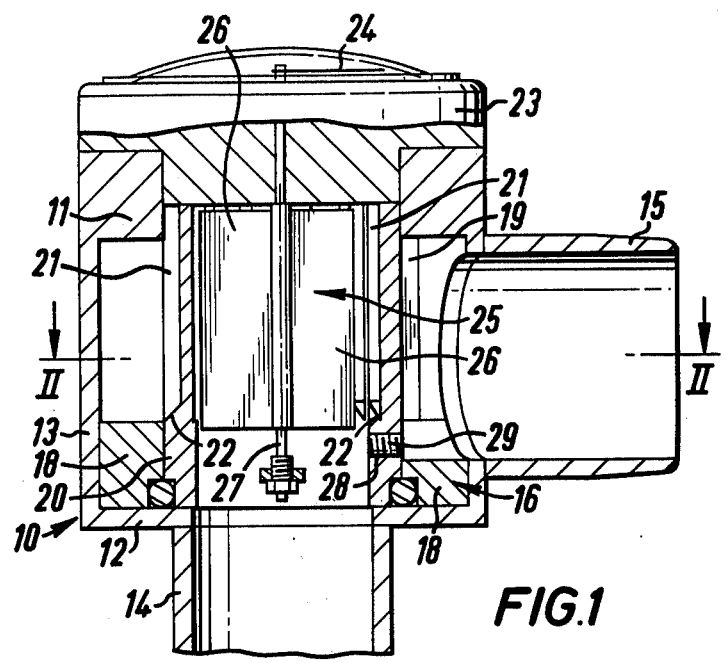
FIG. 1 is a partly sectioned side view of one form of instrument in which this invention is embodied and which is for indicating rate of flow of air or gas for respiration, the instrument being sectioned on the line I—I of FIG. 2.

The instrument illustrated in the drawings comprises a cup-shaped casing 10 which has an internal circumferential flange 11 formed at its brim and two circular apertures formed respectively at the centre of its base 12 and in the cylindrical wall 13, a tubular outlet 14 carried coaxially by the base 12 outside the casing 10, the aperture in the base 12 and the bore of the tubular outlet 14 having the same diameter and being aligned coaxially, and a tubular inlet 15 carried by the cylindrical wall 13 outside the casing 10 so that it projects radially from the casing 10, the bore of the tubular inlet 15 and the aperture in the cylindrical wall 13 having the same diameter and being aligned coaxially.

The circumferentially extending corner formed within the cavity of the casing 10 between the base 12 and the cylindrical wall 13 is lined by a composite ring 16.

Figure 2:
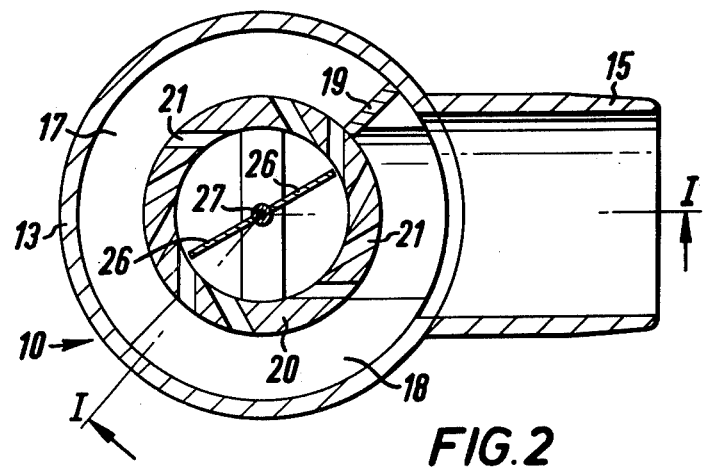
FIG. 2 is a section of the instrument shown in FIG. 1 on the line II—II in FIG. 1.
Figure 3:
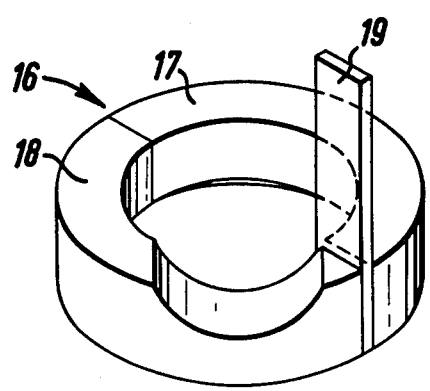
FIG. 3 is an isometric view of a detail of the instrument shown in FIGS. 1 and 2.

FIGS. 2 and 3 show that the ring 16 comprises two arcuate parts 17 and 18 and a rectangular plate 19. The arcuate parts 17 and 18 abut one another at one end. One end of the plate 19 is sandwiched between the other ends of the arcuate parts 17 and 18 to comprise an annular insert and the remainder of the plate or annular insert 19 projects from the arcuate parts 17 and 18 towards and into contact with the flange 11 as can be seen from FIG. 1. The lateral axis of the plate 19 is substantially radial with respect to the ring 16. The arcuate parts 17 and 18 are generally rectangular in cross-section and each of them is rebated at the end of its inner face that is adjacent the base 12. A corresponding rectangular cutout is formed at the aligned corner of the plate 19 as well. The diameter of the unrebated part of the inner face of the arcuate parts 17 and 18 is substantially equal to the diameter of the radially inner face of the flange 11. The plate 19 is adjacent the rear edge of the tubular inlet 15, as considered in the clockwise sense as seen in FIG. 2. The upper surface of the arcuate part 18 that is aligned with the tubular inlet 15 is relieved to form an arcuate recess so that the part of the tubular inlet 15 that is nearest to the base 12 is not obstructed by the arcuate part 18.

A tubular stator 20 is spigotted into the bores of the flange 11 and the composite ring 16. One end of the stator 20 abuts the base 12 and the stator 20 is rebated externally at that end. That rebate, the rebates in the arcuate parts 17 and 18 and the cutout in the plate 19 together from an annular groove in which an 'O'-ring is located, the 'O' ring sealing against leakage of air or gas between the stator 20 and the base 12. The length of the stator is greater than the distance between the base 12 and the flange 11 but is less than the sum of that distance and the thickness of the flange 11. Ten slots 21 are formed in the tubular wall of the stator 20 at cicumferentially-spaced intervals. Each slot 21 is oblique to the radii and tangents at either of its ends and is orientated so that, when considered in the clockwise direction as seen in FIG. 2, its radially inner end leads its radially outer end. Each slot 21 extends to the end of the tubular stator 20 remote from the base 12 and has a curved end face 22 at its other end, the outer end of that curved end face 22 being adjacent to the face of the composite ring 16 remote from the base 12 and the inner end of the curved face 22 being further from the base 12 than is the outer end. A gear box 23, which carries a counting gear train (not shown) and an indicator dial (not shown) which is swept by a pointer 24, is fitted to the cup-shaped casing 10 so that that part of the gear box 23 remote from the indicator dial is spigotted into the central aperture of the annular flange 11 and abuts the end of the tubular stator 20 remote from the base 12.

A rotor 25, comprising a pair of axial vanes 26, is supported coaxially within the tubular stator 20 for rotation about its axis. The rotor spindle 27 projects into the gear box 23 and is drivingly coupled to the pointer 24 by the counting gear train. Hence the location of the pointer 24 with respect to the indicator dial is an indication of rotation of the rotor 25.

A tapped bore 28 is formed through that part of the tubular stator that is aligned with the arcuate recess in the arcuate part 18. The tapped bore receives the usual by-pass jet insert 29 that is provided for calibrating purposes and has its inner end located between the vanes 26 and the outlet 14.

The plate 19 forms a barrier which substantially closes the annular space formed between the tubular stator 20, the cylindrical wall 13, the annular flange 11 and the composite ring 16. The volume of the annular space formed between the tubular stator 20, the cylindrical wall 13, the annular flange 11 and the composite ring 16 is approximately 80% of the volume of the annular cavity that is formed between the flange 11 and the base 12 and which has the same inside diameter as the flange 11 and the inside diameter of the cylindrical wall 13 as its outside diameter.

Hence in use of the instrument, air or gas for respiration enters the annular gallery formed between the cylindrical wall 13 and the tubular stator 20 and circulates around that annular gallery in a clockwise direction as seen in FIG. 2, air or gas flow in the opposite direction being prevented by the barrier 19. Some of the air or gas that flows around the tubular stator 20 in a clockwise direction as seen in FIG. 2 enters each slot 21, being deviated from the circumferential path by an acute angle. The air or gas that flows into each slot 21 emerges from the radially inner end of each slot 21 so that it forms a spirally swirling gas flow within the bore of the tubular stator 20, that spirally swirling gas flow driving the rotor 25 which in turn drives the pointer 24 through the counting gear train housed in the gear box 23. The position of the pointer 24 relative to the indicator dial indicates volume of flow of air or gas for respiration through the instrument.

The optimum number of slots 21 formed in the tubular stator 20 is a nice compromise between the conflicting requirements of sensitivity and pressure drop across the instrument, because both the sensitivity and the pressure drop increase with a reduction in the number of slots. The annular part of the composite ring 16 comprises an annular insert which is located within the annular alcove that is formed by the end portion of the annular cavity that extends between the outer ends of the slots 21 and the base 12. The recessed face of the annular part of the composite ring 16 forms an annular end wall of the annular gallery. Provision of the annular part of the composite ring 16 reduces the volume of the dead space within the instrument without increasing the resistance to airflow through the instrument unacceptably and without interfering with the sensitivity of the instrument unacceptably, and also contributes to an increase in the velocity of air flow through the slots 21. Reduction of the dead space within the instrument is well known to be a desirable objective and is especially important for instruments that are to be used to indicate the respiratory performance of either the very young or the very sick. Furthermore the composite ring 16 does not interfere with the calibrating capability of the instrument.

The plate 19 is an example of a number of different forms of barrier that might be provided in an embodiment of this invention. The barrier might not completely close the annular gallery formed between the stator 20, the wall 13, the flange 11 and the composite ring 16 and thus might not completely prevent air or gas flow in the anti-clockwise direction as seen in FIG. 2. The extent to which the annular gallery is closed by the barrier could be varied and that variation could be utilized as an aide to calibration of the instrument either as well as or instead of the calibrating jet insert 29.

I claim:

1. Respiratory flow rate measuring apparatus comprising a tubular stator which has oblique slots formed in its tubular wall; a casing within which said tubular stator is mounted and which forms a circumferential gallery around the tubular stator, a first port which communicates with the gallery at one end and which projects outwardly with respect to the stator from that end, and a second port which communicates with the interior of the tubular stator and which is in substantially coaxial alignment with the tubular stator; a rotor which is mounted for rotation within the stator; means by which a readout indication of respiratory flow rate is derived from rotation of the rotor; and a barrier which extends across the gallery so that substantially all respiratory flow which enters the gallery from said first port is constrained to flow around the tubular stator in one circumferential direction only, respiratory flow so circulated around the tubular stator being passed through to the interior of the tubular stator via the oblique slots and forming within the interior of the tubular stator a spirally swirling respiratory flow which drives the rotor, the location of the radially outer ends of the oblique slots and the orientation of the oblique slots with respect to said one circumferential direction being such that the angle by which the respiratory flow enters each slot from the gallery deviates from the respiratory flow path around the tubular stator is an acute angle.

2. Respiratory flow rate measuring apparatus according to claim 1, wherein the barrier blocks the gallery completely.

3. Respiratory flow rate measuring apparatus according to claim 1, wherein the barrier blocks the gallery partially.

4. Respiratory flow rate measuring apparatus according to claim 1, wherein the barrier is located adjacent a mouth edge of said first port that is formed at said one end of said first port, the barrier being located between said mouth edge and the oblique slot that, in the context of said one circumferential direction of flow within the gallery, is the furthest from said mouth.

5. Respiratory flow rate measuring apparatus according to claim 4, in which the gallery extends axially beyond each of the outer openings of the oblique slots, wherein an annular insert, which is located within the gallery, forms an annular end wall of the gallery, the annular end wall extending across the annular gallery and being aligned substantially with the said one ends of each of the outer openings.

6. Respiratory flow rate measuring apparatus according to claim 5, in which the plane that is normal to the axis of the stator and that contains the axis of said first port passes through each of the openings and the distance between said plane and said one end of each of the openings is less than the radius of the inlet, wherein the surface of the annular insert that forms said annular end wall is recessed at a location which is aligned with the inlet.

7. Respiratory flow rate measuring apparatus according to claim 5, in which said second port is nearer to said one end of each of the openings than to the other ends of those openings.

8. Resporatory flow rate measuring apparatus according to claim 5, wherein the barrier and the annular insert together comprise a composite ring from which the barrier projects.

* * * * *